US005451175A

United States Patent [19]

Smith et al.

[11] Patent Number: 5,451,175

[45] Date of Patent: Sep. 19, 1995

[54] METHOD OF FABRICATING ELECTRONIC DEVICE EMPLOYING FIELD EMISSION DEVICES WITH DIS-SIMILAR ELECTRON EMISSION CHARACTERISTICS

[75] Inventors: Robert T. Smith, Mesa; Robert C. Kane, Scottsdale, both of Ariz.

[73] Assignee: Motorola, Inc., Schaumburg, Ill.

[21] Appl. No.: 177,898

[22] Filed: Jan. 6, 1994

Related U.S. Application Data

[62] Division of Ser. No. 831,705, Feb. 5, 1992, Pat. No. 5,278,472.

[51] Int. Cl.[6] .................................... H04B 1/10

[52] U.S. Cl. .................................... 445/50; 445/24; 445/46; 445/49; 445/51; 437/187; 437/228; 148/DIG. 100; 216/17; 216/40

[58] Field of Search .................... 313/309, 336, 351; 445/24, 49, 50, 46, 51; 156/625, 634; 437/228, 187; 148/DIG. 100

[56] References Cited

U.S. PATENT DOCUMENTS

| | | | |
|---|---|---|---|
| 5,012,153 | 4/1991 | Alkinson et al. | 313/336 |
| 5,030,895 | 7/1991 | Gray | 315/350 |
| 5,064,396 | 11/1991 | Spindt | 445/50 |
| 5,103,145 | 4/1992 | Dooran | 313/336 |
| 5,136,764 | 8/1992 | Vasquez | 437/228 |
| 5,150,019 | 9/1992 | Thomas et al. | 313/336 |
| 5,173,697 | 12/1992 | Smith et al. | 313/336 |
| 5,218,273 | 6/1993 | Kane et al. | 313/336 |
| 5,229,331 | 7/1993 | Doan et al. | 437/228 |
| 5,312,777 | 5/1994 | Cronin et al. | 437/228 |

*Primary Examiner*—Olik Chaudhuri
*Assistant Examiner*—Long Pham
*Attorney, Agent, or Firm*—Eugene A. Parsons

[57] ABSTRACT

An electronic device including a plurality of field emission devices exhibiting dis-similar electron emission characteristics wherein an aperture radius associated with each of the plurality of field emission devices determines the electron emission characteristic.

7 Claims, 6 Drawing Sheets

100

100

METHOD OF FABRICATING ELECTRONIC DEVICE EMPLOYING FIELD EMISSION DEVICES WITH DIS-SIMILAR ELECTRON EMISSION CHARACTERISTICS

This is a division of application Ser. No. 07/831,705, filed Feb. 5, 1992, now U.S. Pat. No. 5,278,472.

FIELD OF THE INVENTION

The present invention relates generally to electronic devices employing field emission devices and more particularly to field emission devices exhibiting dis-similar electron emission characteristics.

BACKGROUND OF THE INVENTION

Field emission devices (FEDs) are known in the art and commonly employed as electronic devices. FEDs are, typically, comprised of at least an electron emitter, for emitting electrons, and an extraction electrode, proximally disposed with respect to the electron emitter. Other FED structures may employ an anode for collecting at least some of any emitted electrons.

In one application of FEDs a plurality of FEDs is selectively operably interconnected as independent groups of FEDs to provide prescribed electron emission levels determined by which of the groups of the plurality of groups is in the active (on) mode. A shortcoming of this method of realizing distinct electron emission levels is that large arrays of FEDs need be employed since each distinct electron emission level is realized by a particular group of FEDs of the array of FEDs.

Accordingly, there is a need for an electronic device employing FEDs and a method for realizing FEDs which overcomes at least some of these shortcomings.

SUMMARY OF THE INVENTION

This need and others are substantially met through provision of an electronic device including supporting substrate having a major surface, an insulator layer disposed on the major surface of the supporting substrate and having a plurality of apertures therethrough wherein at least some of the plurality of apertures have a first aperture radius and wherein at least some other of the plurality of apertures have a second aperture radius not the same as the first aperture radius, an electron emitter disposed in each of the plurality of apertures and further disposed on and operably coupled to the major surface of the supporting substrate, and an extraction electrode disposed on the insulator layer and at least partially peripherally, symmetrically about the plurality of apertures, the extraction electrode being adapted to have a voltage source coupled to the supporting substrate and the extraction electrode, such that a plurality of field emission devices are realized wherein application of a voltage via the voltage source induces dis-similar electron emission from electron emitters, of the plurality of field emission devices, associated with apertures having dis-similar aperture radii.

This need and others are further met through provision of a method for forming an electronic device having a plurality of field emission devices including the steps of providing a supporting substrate having a major surface, depositing an insulator layer on the major surface of the supporting substrate, the insulator layer having a plurality of apertures disposed therethrough wherein at least some of the plurality of apertures have a first aperture radius and wherein at least some other of the plurality of apertures have a second aperture radius not the same as the first aperture radius, depositing an electron emitter by a substantially normal material evaporation in at least some of the plurality of apertures and operably coupled to the major surface of the supporting substrate, and depositing an extraction electrode on the insulator layer and peripherally, symmetrically about at least a part of at least some of the apertures of the plurality of apertures, such that application of a voltage between the extraction electrode and the substrate via a voltage source induces dis-similar electron emission from electron emitters associated with apertures having dis-similar aperture radii.

DETAILED DESCRIPTION OF PREFERRED EMBODIMENTS

Figure 1:
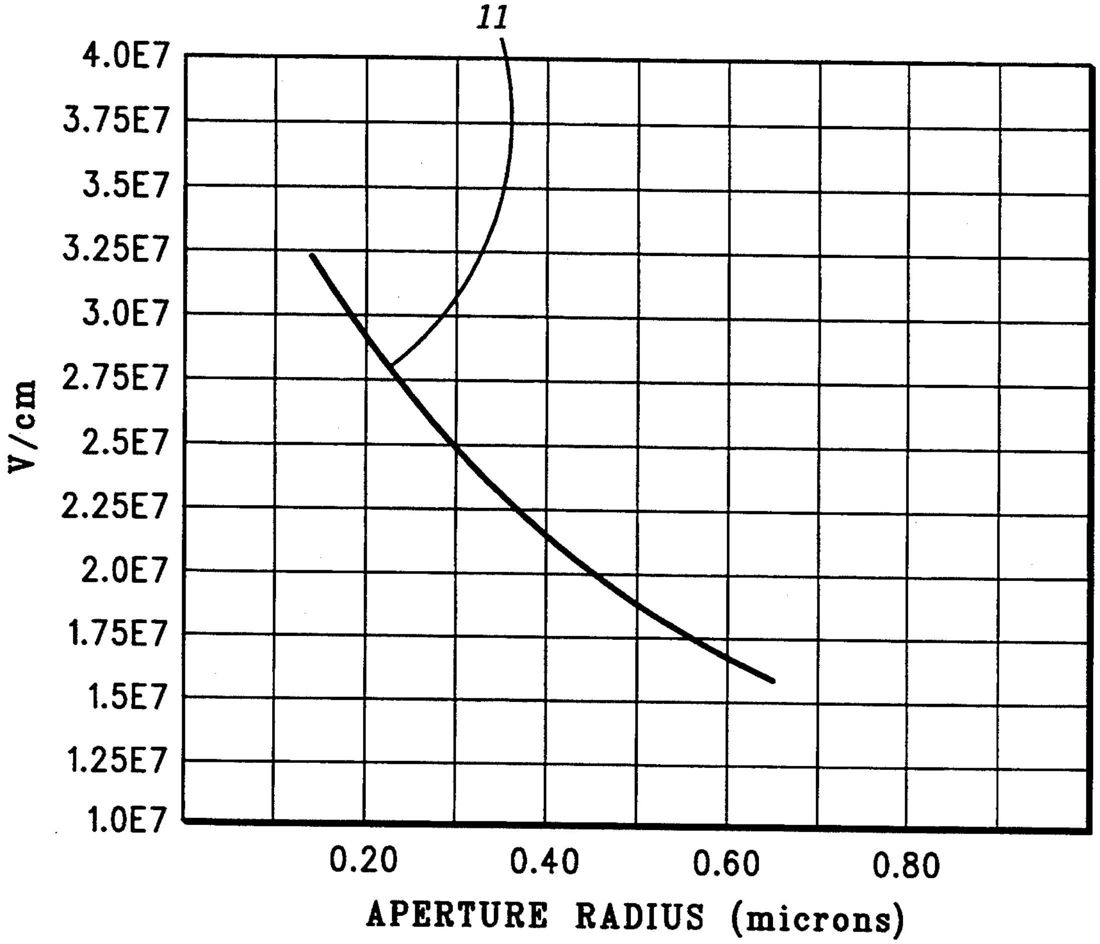
FIG. 1 is a graphical representation of the relationship which exists between electric field and aperture radius with respect to FEDs.

Referring now to FIG. 1 there is depicted a graphical representation illustrating a computer model analysis of the relationship between an electric field, induced near the surface proximal to the tip of an electron emitter of a FED, and the radius of an aperture associated with the FED. A curve 11 representing an induced electric field characteristic indicates that as the aperture radius is decreased the electric field increases. FEDs typically employ an induced electric field which is provided by application of an externally provided voltage source between an extraction electrode and a supporting substrate on which an electron emitter is disposed and operably coupled. FED operation (electron emission) is directly related to the magnitude of the induced electric field. It is known in the art that this relationship may be expressed substantially as:

$$I = \int JS$$

where:

J is the current density as a function of position with respect to the electron emission surface, and S is the electron emission surface.

For the structure now under consideration we have that the current density distribution is substantially Gaussian over the emission surface with substantially all of the meaningful electron emission occurring within the limits of $\pm\pi/2$ degrees from the normal (perpendicular to an associated supporting substrate) for an electron emitter, as commonly employed in the art, with an electron emission surface comprising a part of a substantially spherical surface on which localized non-conformities/protuberances may be disposed and generally known as the emitter tip. This yields:

$$J=J_{max}(2\pi\partial^2)^{-\frac{1}{2}}\exp^{(-o^2/2\partial^2)}$$

Where, from the Fowler-Nordheim relationship of the prior art $J_{max}$ is determined as:

$$J_{max}=AE^2\exp(-6.83\times10^7 w^{3/2}/v/E)$$

where:

$A=(3.18\times10^{-11}/V^2/w)^{\frac{1}{2}}$, $v=0.95-(3.79\times10^{-4}E^{\frac{1}{2}}/w)^2$, E is the electric field induced at the electron emitter tip surface determined as $$E=dV/dz\approx\Delta V/\Delta z,$$

w is the surface work function of the material of which the electron emitter is comprised, and $S=2\pi r^2 \sin o do$ where r is taken as the radius of curvature of the representative spherical emission surface.

Substitution in the above integral yields, $$I=(2\pi r^2/\partial^2)^{\frac{1}{2}}J_{max}\int(o-o^3/3!)\exp^{(-o^2/2\partial^2)}do$$

where the term sin o has been replaced by a truncated series expansion.

For a typical field emission device exhibiting a substantially Gaussian emission profile, with respect to the emission surface we may use, $r=300\times10^{-10}$ m $w=4.0$ $\partial=13.37$ deg$=0.233$ rad.

$V=60$ volts to determine both the electric field at the electron emitter tip and the emitted current from the FED.

Figure 2:
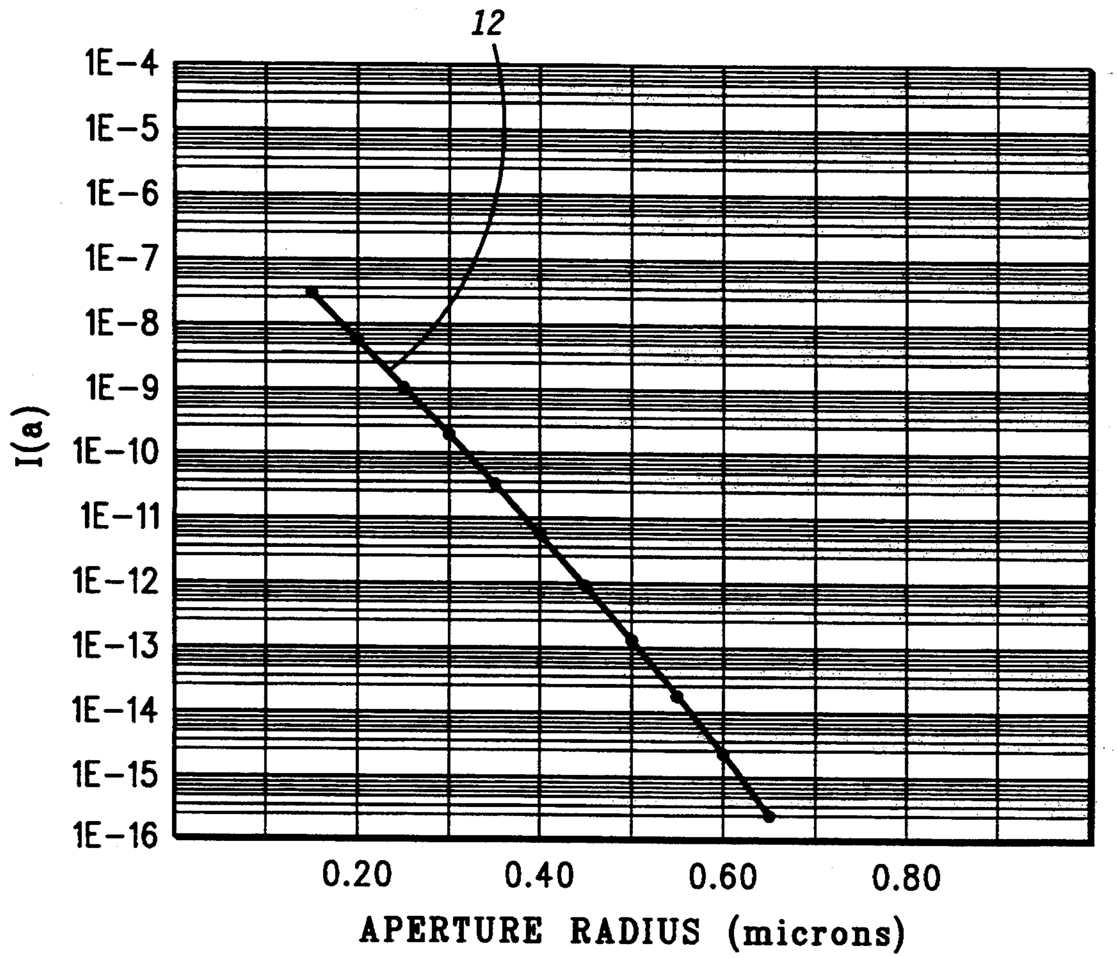
FIG. 2 is a graphical representation of the relationship which exists between electron emission and aperture radius with respect to FEDs.

FIG. 2 is a graphical representation of a computer model analysis employing the electron emitter current function described above to provide a relationship between FED emitted current, I(A), and FED aperture radius. A current characteristic curve 12 clearly illustrates that as the FED aperture radius is decreased the emitted current increases correspondingly.

Figure 3:
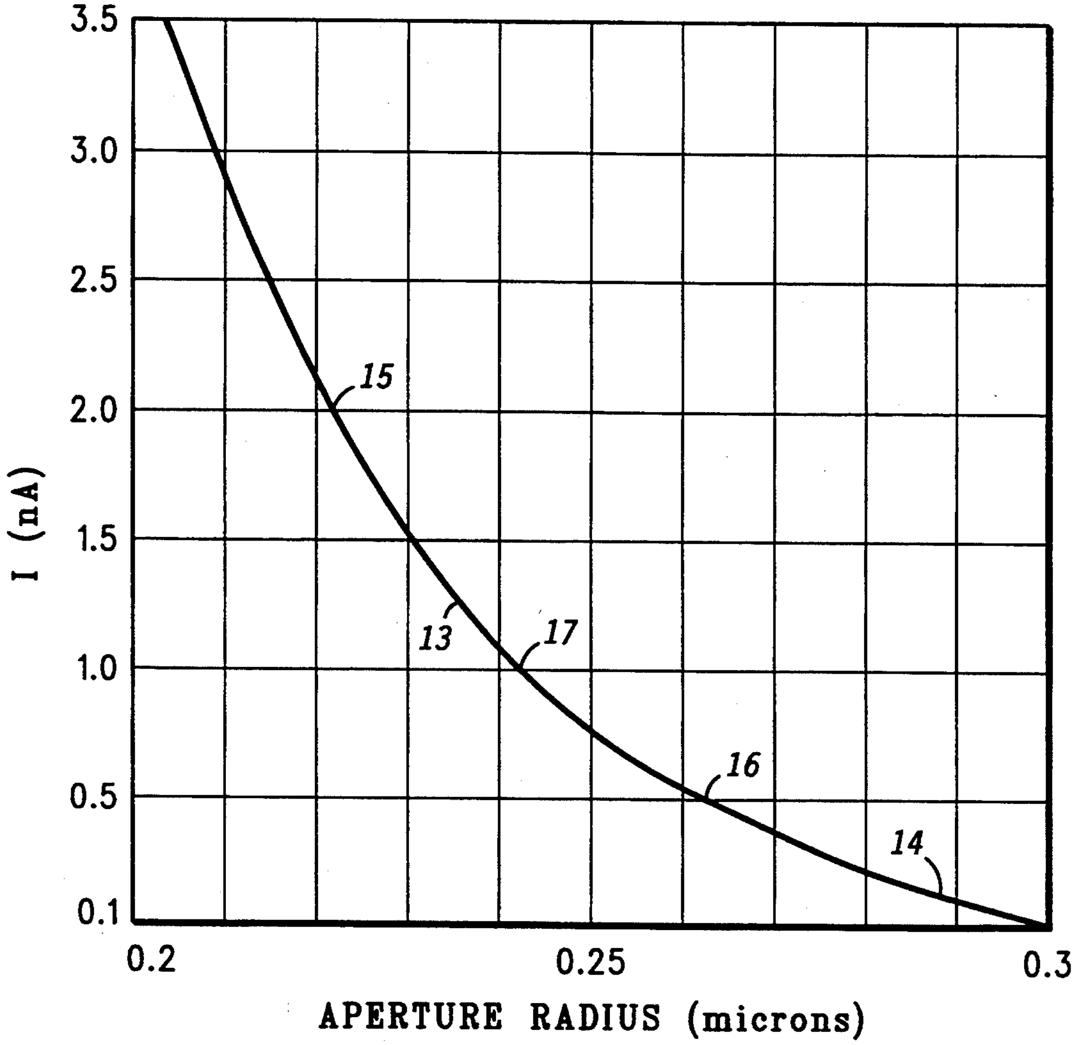
FIG. 3 is an expanded view of a part of the graphical depiction of FIG. 2.

FIG. 3 is a graphical representation of a part of the computer model analysis data described previously with reference to FIG. 2 illustrating an expanded portion 13 of current characteristic curve 12. For expanded portion 13 it is observed at a first point 14 that an aperture radius of approximately 0.285 microns corresponds to FED electron current of 0.2 nAmps. and that at a second point 15 an aperture radius of approximately 0.225 microns corresponds to FED electron current of 2.0 nAmps. Thus, an order of magnitude variation in FED electron current is realized by modifying the aperture radius of corresponding FEDs.

FIG. 3 further depicts a point 16 associated with expanded portion 13 where an aperture radius of approximately 0.264 microns corresponds to an FED electron current of 0.5 nAmps. and a point 17 where an aperture radius of approximately 0.2425 microns corresponds to an FED electron current of 1.0 nAmp. The relationship between the two points, 16 and 17, provides a factor of two differential in electron current based primarily on aperture radius variation alone.

Thus by selecting appropriate aperture radii a plurality of FEDs comprising an electronic device with prescribed electron emission characteristics, may be realized wherein each of the FEDs employes similar externally provided extraction voltages to yield dis-similar electron emission characteristics.

Figure 4:
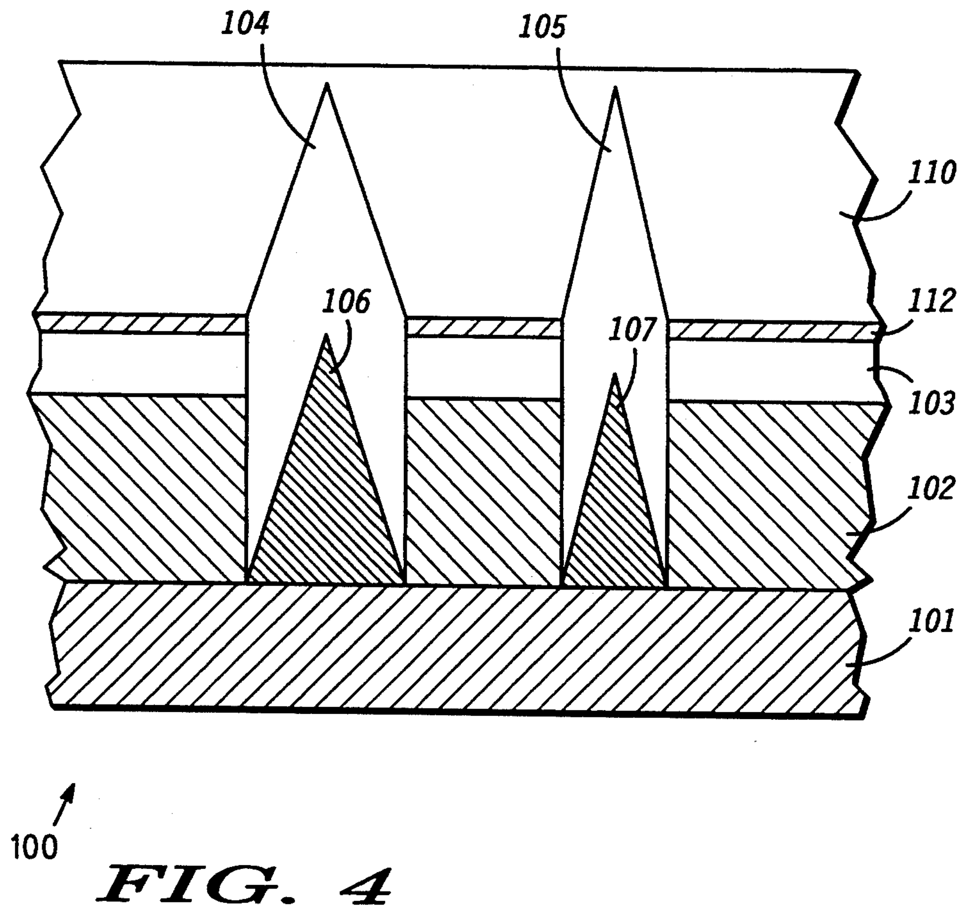
FIG. 4 is a partial side-elevational cross-sectional depiction of an electronic device employing FEDs which is realized by performing various steps of a method in accordance with the present invention.

Referring now to FIG. 4 there is shown a partial side elevational cross-sectional depiction of an electronic device 100 employing a plurality of FEDs, which is realized by performing various steps of a method in accordance with the present invention. A supporting substrate 101 having a major surface is provided whereon a first insulator layer 102 is disposed. Layer 102 has first and second apertures 104 and 105 extending therethrough. In this specific embodiment a first aperture radius corresponds to aperture 104 and a second aperture radius corresponds to aperture 105 wherein the first and second aperture radii are dis-similar. An extraction electrode 103, including a layer of conductive/-semiconductive material, is disposed on insulator layer 102 and substantially peripherally, symmetrically about the first and second apertures 104 and 105. A lift-off layer 112 including a material such as aluminum which may be subsequently removed by any of the many methods known in the art such as selective etching is deposited on extraction electrode layer 103. FED electron emitters 106 and 107 are selectively deposited into apertures 104 and 105 so as to be coupled to the surface of supporting substrate 101, by methods commonly employed in the art such as normal (perpendicular with respect to the associated supporting substrate) material evaporation. As a result of material evaporation, encapsulation material 110 is deposited on lift-off layer 112 and closes-over apertures 104 and 105. As apertures 104 and 105 are closed-over electron emitters 106 and 107 are formed with the shape as depicted.

A number of techniques commonly known in the art may be employed to realize apertures 104 and 105 of device 100. One such method employs a selectively patterned photoresist material which is disposed on insulator layer 102 and subsequently exposed to an etch process to remove some of the material of insulator layer 102 to realize apertures 104 and 105. In this method the photoresist material may be preferentially patterned to provide features of dis-similar radii to yield apertures of dis-similar radii as may be desired. In another commonly employed method, a photoresist material is deposited on extraction electrode layer 103 and patterned as desired to exhibit the dis-similar aperture radii and subsequently exposed to an etch step wherein apertures 104 and 105 are realized by an etch step which proceeds through both extraction electrode layer 103 and insulator layer 102. In each of the many known methods the remaining photoresist material is removed subsequent to the formation of apertures 104 and 105.

In the instance of non-circular apertures, such as elongated slots/serpentine apertures, the reference to aperture radius serves to define the distance from the apex of a wedge shaped electron emitter, disposed in the associated aperture, to the extraction electrode layer.

Figure 5:
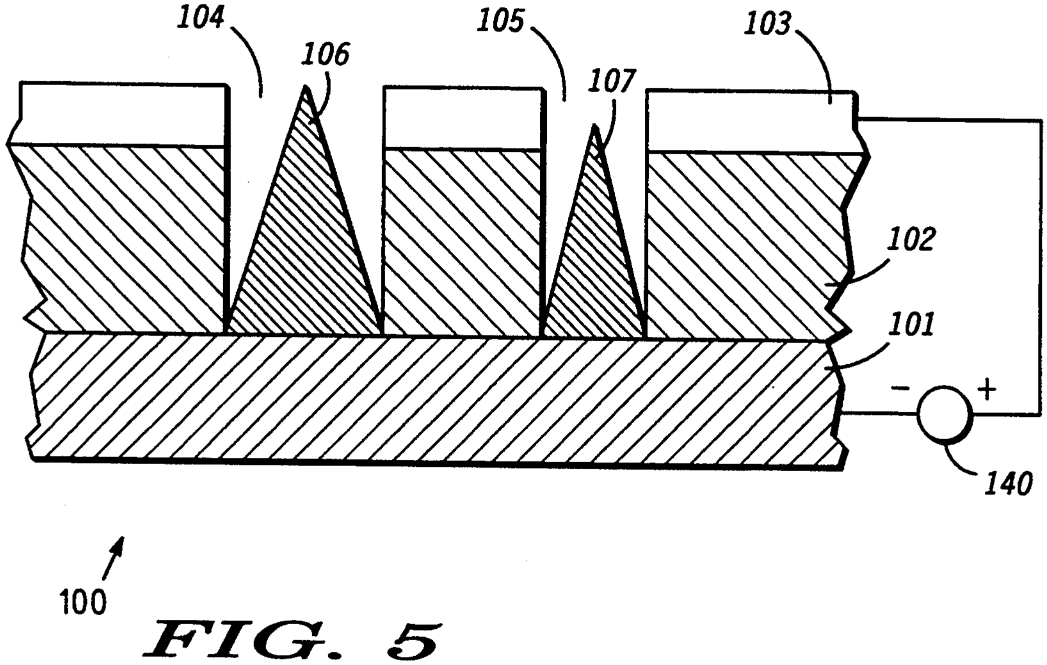
FIG. 5 is a partial side-elevational cross-sectional depiction of the structure of FIG. 4 after performing additional steps of the method.

FIG. 5 is a side elevational cross-sectional depiction of electronic device 100 having undergone an additional step of the method wherein lift-off layer 112 is removed along with encapsulation material 110. Additionally, an externally provided voltage source 140 is operably connected to extraction electrode 103 and supporting substrate 101. By applying a voltage of suitable magnitude and potential an electric field is induced at each of electron emitters 106 and 107. However, since the aperture radius of second aperture 105, in which second electron emitter 107 is disposed, is dis-similar to (smaller than) the aperture radius of first aperture 104, in which first electron emitter 106 is disposed, the electric field induced at electron emitter 107 is greater than the electric field induced at electron emitter 106. Consequently, electron emission (electron current) from electron emitter 107 is dis-similar to (greater than) electron emission from electron emitter 106.

Figure 6:
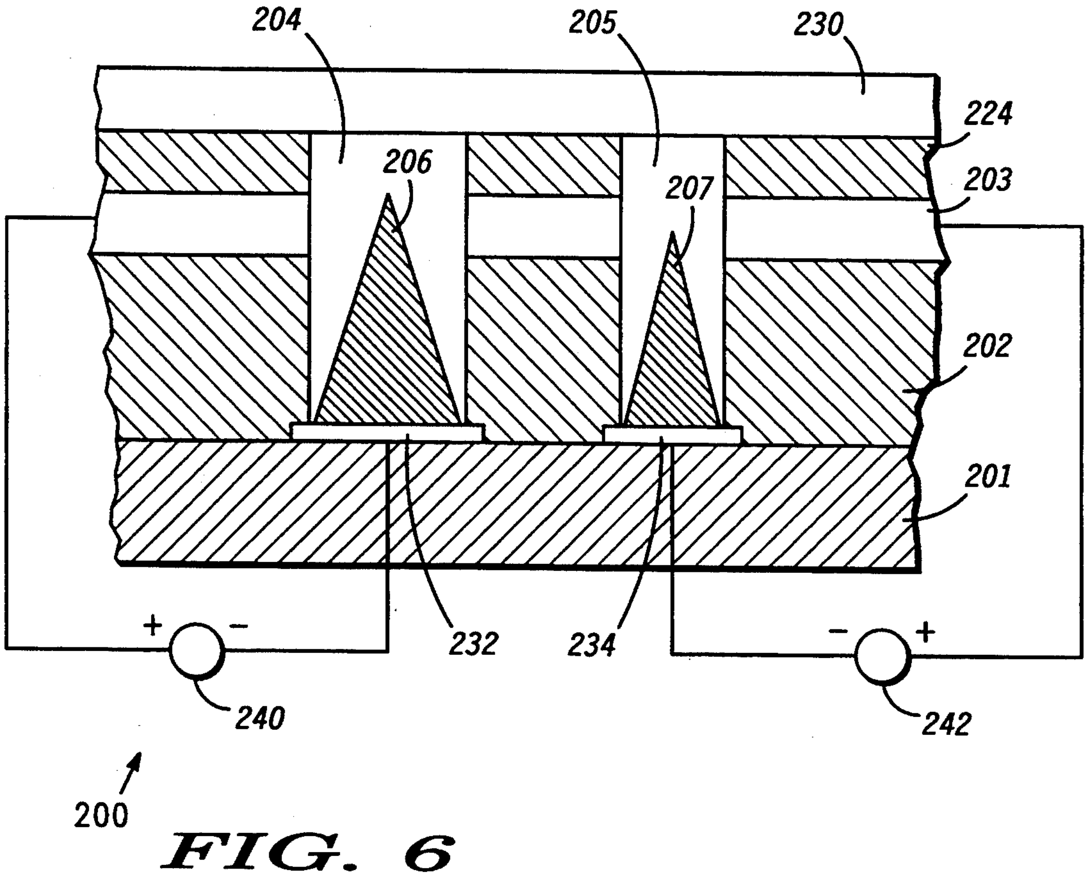
FIG. 6 is a partial side-elevational cross-sectional depiction of an electronic device similar to FIG. 4 realized by performing various steps of another method in accordance with the present invention.

FIG. 6 is a side elevational cross-sectional depiction of an electronic device 200 similar to that described previously with reference to FIGS. 4 and 5 and wherein similar components are designated with similar numbers having a "2" prefix to indicate a different embodiment. Device 200 further includes a second insulator layer 224 disposed on an extraction electrode layer 203 with electron emitters 206 and 207 each disposed on one of a plurality of conductive/semiconductive paths 232, 234, respectively. Conductive/semiconductive paths 232, 234 are disposed on the major surface of a supporting substrate 201. FIG. 6 further depicts an anode 230, for collecting at least some emitted electrons, disposed on second insulator layer 224 and distally with respect to electron emitters 206 and 207 of the plurality of FEDs.

A first externally provided voltage source 240 is operably coupled between extraction electrode layer 203 and conductive path 232 of the plurality of conductive paths and a second externally provided voltage source 242 is operably coupled between the extraction electrode layer 203 and conductive path 234 of the plurality of conductive paths. So configured, operation of the FEDs of the plurality of FEDs depicted may be selectively effected.

Figure 7:
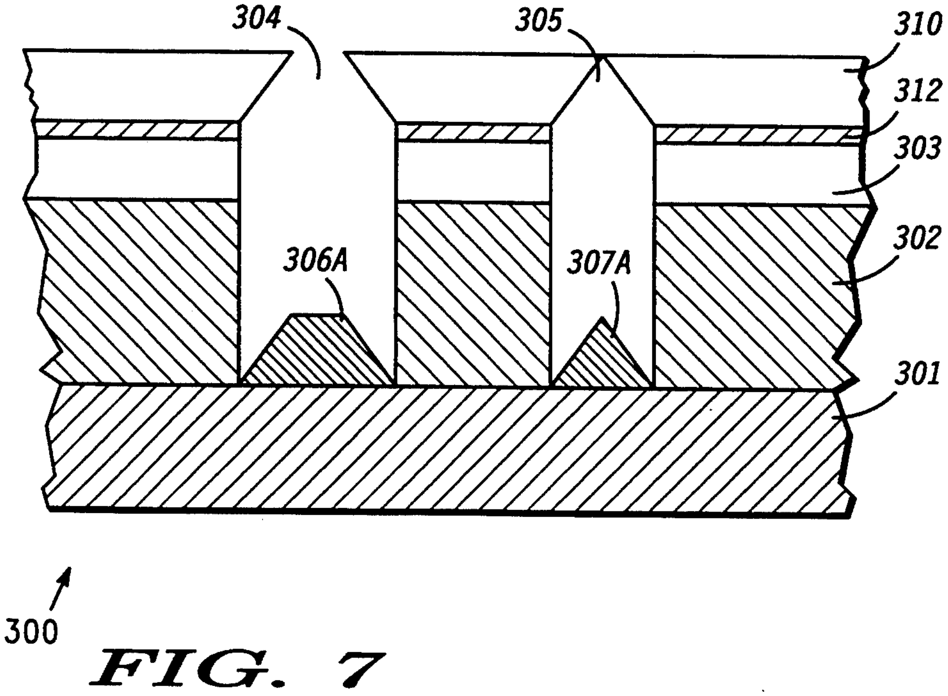
FIG. 7 is a partial side-elevational cross-sectional depiction of an electronic device employing FEDs realized by performing various steps of another method in accordance with the present invention.

FIG. 7 is a partial side elevational cross-sectional depiction of a structure 300 of yet another embodiment of an electronic device employing a plurality of FEDs which is realized by performing various steps of another method in accordance with the present invention. Features corresponding to features originally identified with reference designators in FIGS. 4–6 are similarly referenced in this embodiment beginning with the numeral "3". FIG. 7 further depicts that the aperture radii are selectively chosen so that the electron emitters are formed by a multiple-evaporation technique wherein a first normal material evaporation is terminated prior to close-over of the aperture associated with the largest aperture radius. As depicted, an electron emitter 307A formed in an aperture 305 having the smallest aperture radius is substantially completely formed whereas, an electron emitter 306A formed in an aperture 304 having the largest aperture radius is formed to the extent that it is shaped as a trapezoidal structure. A lift-off layer 312 is removed after this first material evaporation is terminated, along with encapsulation layer 310 (the excess evaporation material).

Figure 8:
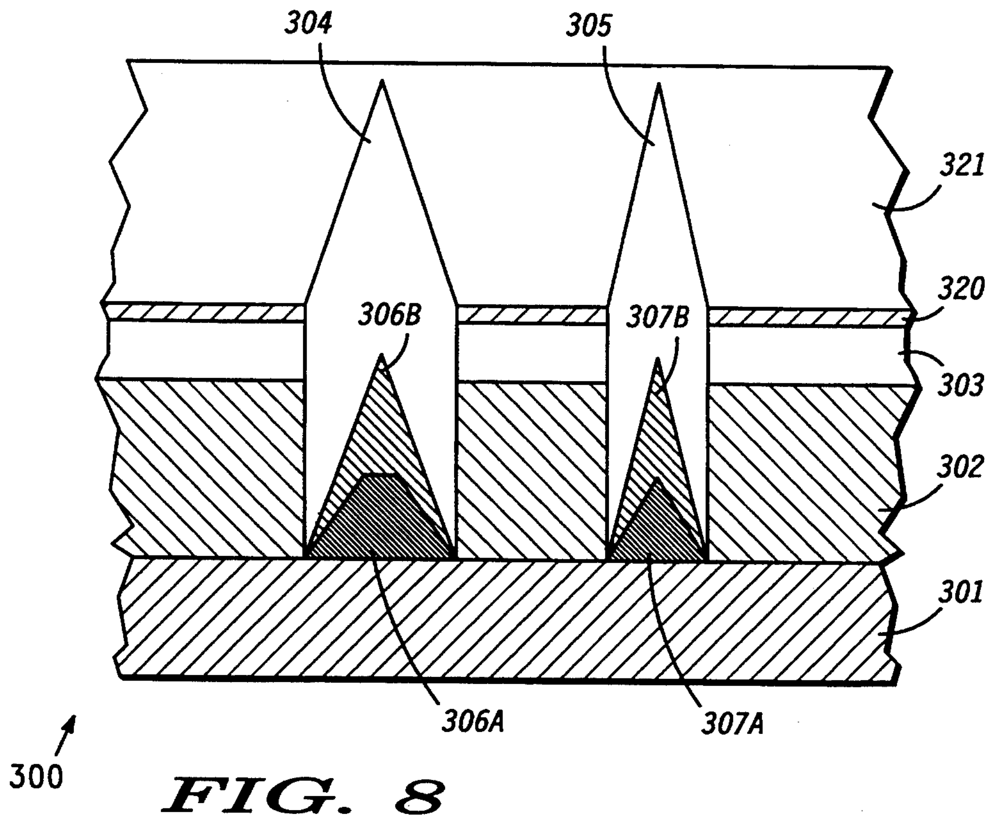
FIG. 8 is a partial side-elevational cross-sectional depiction of an electronic device similar to that of FIG. 7 realized by performing other and/or different steps of the method in accordance with the present invention.

FIG. 8 is a partial side elevational cross-sectional depiction of device 300 having undergone an additional normal material evaporation wherein additional material 306B and 307B is deposited to continue formation of the electron emitters in each of apertures 304 and 305. Prior to the second normal evaporation, a second lift-off layer 320 is deposited on layer 303 and the second normal material evaporation forms an encapsulation layer 321. In the instance of the method now under consideration, the multiple material evaporation technique provides that electron emitters associated with apertures of dis-similar aperture radius may be formed with substantially the same height. Electron emitter 306A, 306B disposed in first aperture 304 and electron emitter 307A, 307B disposed in the second aperture 305 each includes material from both the first and second normal material evaporation. Subsequent to formation of the electron emitters, lift-off layer 320 is removed at which time encapsulation layer 321 is also removed. It is anticipated that alternative structures employing more than two normal material evaporations may be realized.

Figure 9:
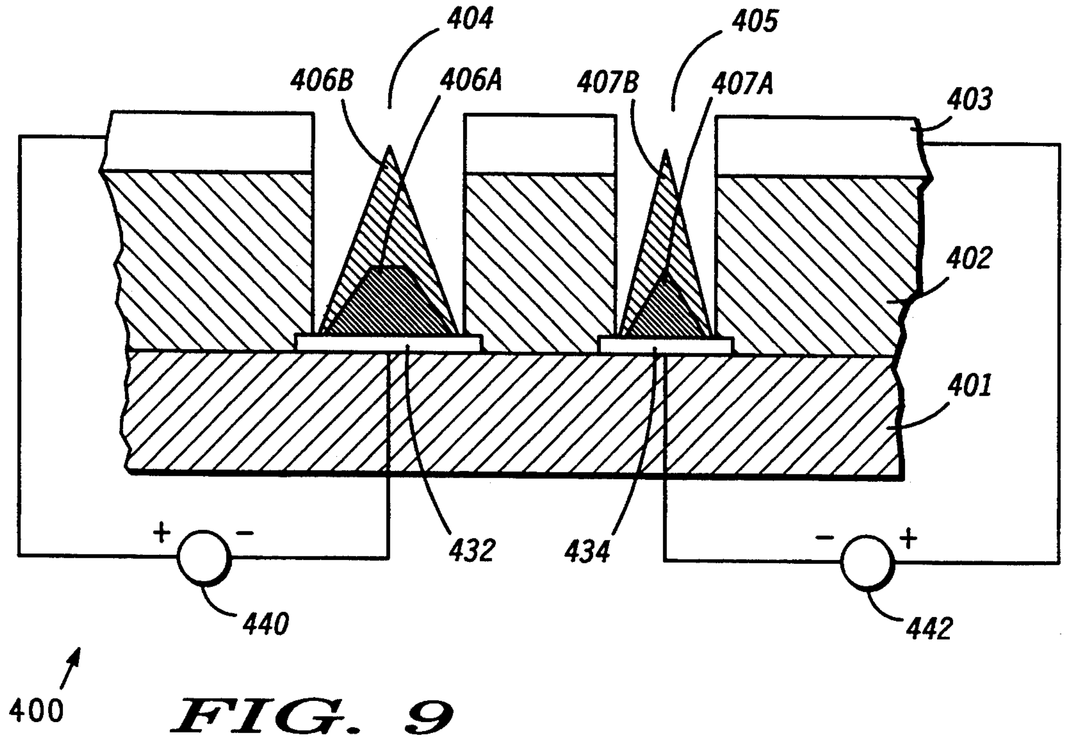
FIG. 9 is a partial side-elevational cross-sectional depiction of an electronic device similar to that of FIG. 7 realized by performing other and/or different steps of the method in accordance with the present invention.

FIG. 9 is a side elevational cross-sectional depiction of an electronic device 400 similar to that described previously with reference to FIGS. 7 and 8 and wherein similar components are designated with similar numbers having a "4" prefix to indicate a different embodiment. Device 400 further includes electron emitters 406A, 406B and 407A, 407B each disposed on one of a plurality of conductive/semiconductive paths 432, 434, respectively. Conductive/semiconductive paths 432, 434 are disposed on the major surface of a supporting substrate 401. A first externally provided voltage source 440 is operably coupled between extraction electrode layer 403 and conductive path 432 of the plurality of conductive paths and a second externally provided voltage source 442 is operably coupled between the extraction electrode layer 403 and conductive path 434 of the plurality of conductive paths. So configured, operation of the FEDs of the plurality of FEDs depicted may be selectively effected.

While we have shown and described specific embodiments of the present invention, further modifications and improvements will occur to those skilled in the art. We desire it to be understood, therefore, that this invention is not limited to the particular forms shown and we intend in the append claims to cover all modifications that do not depart from the spirit and scope of this invention.

What we claim is:

1. A method for forming an electronic device having a plurality of field emission devices including the steps of:

providing a supporting substrate having a major surface;

depositing an insulator layer on the major surface of the supporting substrate, the insulator layer having a plurality of apertures disposed therethrough wherein at least some of the plurality of apertures have a first aperture radius and wherein at least some other of the plurality of apertures have a second aperture radius not the same as the first aperture radius;

depositing an electron emitter by a substantially normal material evaporation in at least some of the plurality of apertures and operably coupled to the major surface of the supporting substrate; and depositing an extraction electrode on the insulator layer and peripherally, symmetrically about at least a part of at least some of the apertures of the plurality of apertures, such that application of a voltage between the extraction electrode and the substrate via a voltage source induces dis-similar electron emission from electron emitters associated with apertures having dis-similar aperture radii.

2. A method for forming an electronic device having a plurality of field emission devices including the steps of:

providing a supporting substrate having a first major surface;

depositing an insulator layer on the major surface of the supporting substrate;

depositing an extraction electrode layer onto the insulator layer;

selectively etching the extraction electrode layer and the insulator layer such that a plurality of apertures are formed therethrough wherein some apertures of the plurality of apertures have a first aperture radius and some other apertures of the plurality of apertures have a second aperture radius different than the first aperture radius;

selectively depositing a lift-off layer onto the extraction electrode layer;

depositing emitter material into at least some apertures of the plurality of apertures by means of a normal evaporation of emitter material such that substantially conical/wedge shaped electron emitters are formed and coupled to the major surface of the supporting substrate, and removing the lift-off layer.

3. A method for forming an electronic device having a plurality of field emission devices including the steps of:

providing a supporting substrate having a major surface;

depositing a first insulator layer on the major surface of the supporting substrate;

depositing an extraction electrode layer onto the insulator layer;

depositing at least a second insulator layer on the extraction electrode layer;

selectively etching the extraction electrode layer, the first insulator layer, and the second insulator layer such that a plurality of apertures are formed therethrough wherein some apertures of the plurality of apertures have a first aperture radius and some other apertures of the plurality of apertures have a second aperture radius different than the first aperture radius; and depositing emitter material into the plurality of apertures by means of a normal evaporation of emitter material such that substantially conical/wedge shaped electron emitters are formed and coupled to the major surface of the supporting substrate.

4. The method of claim 3 and further including the steps of:

selectively depositing a lift-off layer on the second insulator layer; and removing the lift-off layer subsequent to the step of depositing emitter material into the plurality of apertures.

5. The method of claim 3 and further including the step of providing an anode disposed on the second insulator layer.

6. A method for forming an electronic device having a plurality of field emission devices including the steps of:

providing a supporting substrate having a major surface;

depositing an insulator layer on the major surface of the supporting substrate;

depositing an extraction electrode layer onto the insulator layer;

selectively etching the extraction electrode layer and the insulator layer such that a plurality of apertures are formed therethrough wherein at least some of the plurality of apertures have a first aperture radius and some other of the plurality of apertures have a second aperture radius different than the first aperture radius;

selectively depositing a lift-off layer onto the extraction electrode layer; and depositing emitter material into the plurality of apertures by means of a plurality of normal evaporations of emitter material such that substantially conical/wedge shaped electron emitters are formed and coupled to the major surface of the supporting substrate.

7. The method of claim 6 and further including the steps of removing the lift-off layer subsequent to performing each of the plurality of normal evaporations of emitter material and depositing a new lift-off layer prior to performing a next normal evaporation.

* * * * *